United States Patent [19]
Gaisford et al.

[11] Patent Number: 5,673,940
[45] Date of Patent: Oct. 7, 1997

[54] FUEL TANK MOUNTING CAGE

[75] Inventors: Thomas E. Gaisford, Payne, Ohio; Patrick G. Gerardot; Brad A. Hively, both of Fort Wayne, Ind.

[73] Assignee: Navistar International Transportation Corp., Chicago, Ill.

[21] Appl. No.: 551,207

[22] Filed: Oct. 31, 1995

[51] Int. Cl.⁶ ................................... B60K 15/07
[52] U.S. Cl. .................... 280/834; 220/562; 224/538
[58] Field of Search ....................... 280/830, 831, 280/833, 834, 781, 784, 800; 248/228.1, 503; 220/562, 401; 224/538

[56] References Cited

U.S. PATENT DOCUMENTS

| | | | |
|---|---|---|---|
| 3,884,255 | 5/1975 | Merkle | 280/834 X |
| 4,093,254 | 6/1978 | Ezaki | 280/834 X |
| 4,098,520 | 7/1978 | Ezaki et al. | 280/834 X |
| 5,366,246 | 11/1994 | Chen et al. | 280/834 |
| 5,380,042 | 1/1995 | Hively et al. | 280/834 |

*Primary Examiner*—Kevin Hurley
*Attorney, Agent, or Firm*—Dennis K. Sullivan

[57] ABSTRACT

A fuel tank protective cage and mounting device for a vehicle such as school bus including a shelf section that is welded to front and rear sections and to right and left longitudinally extending members to provide a protective cage that is a totally welded structure. The right and left longitudinally extending members protect the fuel tank from puncture by the edges of the lower flange of the frame rails and also adds considerable strength and rigidity to the protective cage and mounting device. The protective cage is secured to the outer vertical surfaces of the frame rails and the fuel tank is located between the frame rails and secured to the cage.

10 Claims, 3 Drawing Sheets

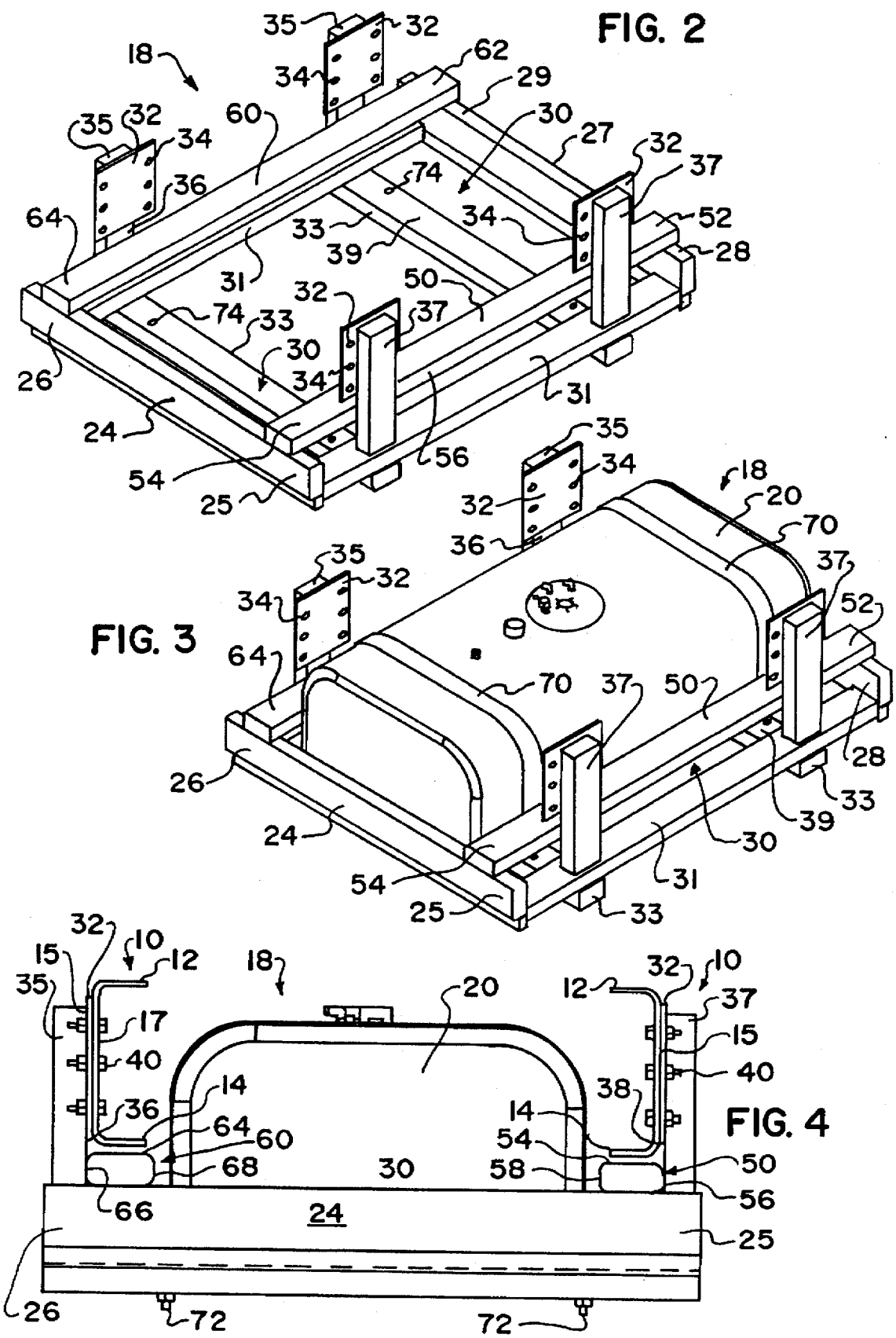

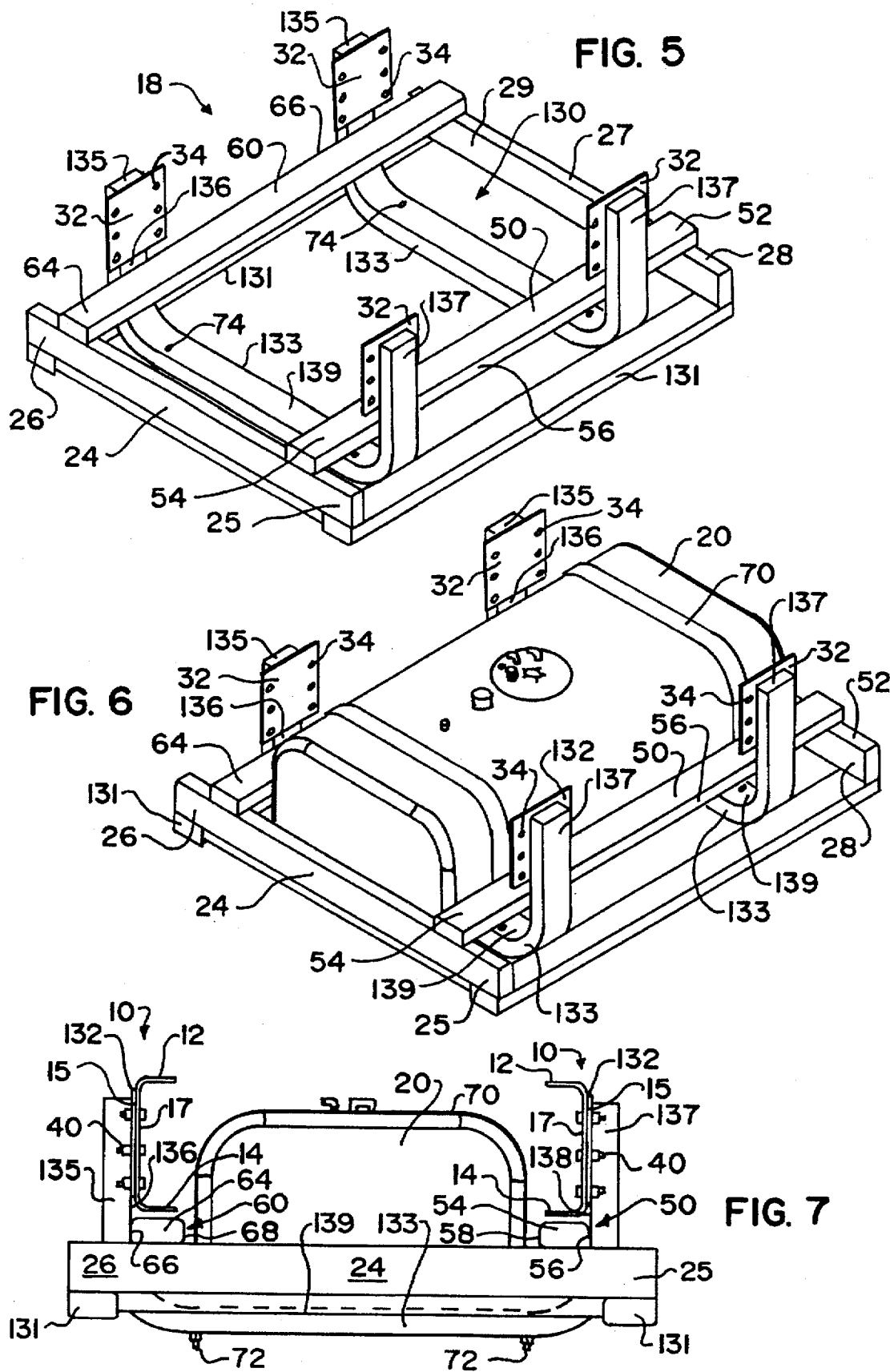

FUEL TANK MOUNTING CAGE

BACKGROUND OF THE INVENTION

The present invention relates generally to a fuel tank mounting and protective cage for use with vehicles such as school buses.

The frames for vehicles such as school buses generally include a pair of longitudinally extending frame rails. The frame rails are formed from C-shaped steel beams that face each other with the webs extending vertically and the flanges extending generally horizontally and toward each other. The space between the facing frame rails is well protected. Much of this protected space is occupied by components such as the exhaust system, the drive shaft that extends from a front mounted engine to the rear drive axle, and brake lines. The vehicle floor extends across the top flange of the frame rails and thus components such as a fuel tank cannot extend above the top flange of the frame rails. When the vehicle engine is located at the front of the vehicle, the fuel tank may be located on the outside of the frame rail and enclosed by a protective cage, such as shown in U.S. Pat. No. 5,366,246 or, in the case of larger tanks, the fuel tank may be located between the rails behind the rear axle. When the vehicle engine is located at the rear of the vehicle, there is available space for a fuel tank to be located between the front and rear axles. However, a large tank, for example a 65 gallon fuel tank, may extend below the lower flanges of the frame rails and the portion of the fuel tank that is below the lower flanges of the frame rails should be protected.

A protective cage for a fuel tank that is located between and below the vehicle frame rails is disclosed in U.S. Pat. No. 5,380,042. The protective cage and mounting device of this patent consist of two side structures and a bottom shelf structure. The bottom shelf structure is bolted to the lower edges of both side structures. This protective cage provides protection to the fuel tank even in crashes in which the other vehicle may go under the frame rails. The sides of the fuel tank that are exposed to the inwardly facing edges of the lower flanges of the frame rails are protected by a sheet metal liner that is provided between the edges and the side of the fuel tank. While this sheet metal liner serves its purpose it adds weight to the protective cage but does not contribute to its strength and rigidity. Also the bolted joint of the protective cage disclosed in U.S. Pat. No. 5,380,042 permits some rotation and local deformation of the protective cage and adds weight that does not contribute to the strength and rigidity of the protective cage.

For the foregoing reasons, there is a need for a lighter weight and stronger fuel tank protective cage that can be used for mounting a fuel tank of the type that extends between and below the vehicle frame rails.

SUMMARY OF THE INVENTION

The advantages provided by this invention is that the protective cage is a totally welded structure or weldment, which lightens the structure and also strengthens it. Also all component parts of the protective cage, except the mounting plates, are formed of low carbon, high strength steel tubing having rectangular cross-sections which greatly increases the strength and rigidity of the unit. Furthermore the sheet metal liners for protecting the sides of the fuel tank against the edge of the lower flange have been replaced by structural members that are integral parts of the protective cage that not only provide better protection to the mid-side portions of the fuel tank but also add strength and rigidity to the protective cage. In addition the protective cage of this invention can be used with vehicles of the type having their engines mounted at the front or the rear of the frame structure. Straps and T-bolts are used to secure the fuel tank to the protective cage and nuts and bolts are used to secure the protective cage to the frame rails, in a known manner. This enables the protective cage to be removed from the vehicle and the fuel tank to be removed from the protective cage for servicing.

This invention has advantages over the prior art identified above and yet retains important features that are present in that prior art. For example, the fuel tank is mounted solely on the protective cage which greatly reduces relative movement between the protective cage and the fuel tank in the event of an accident. The fuel tank itself adds rigidity to the protective cage. Also the protective cage, as a result of its construction and the material from which it is fabricated, absorbs more impact energy in the event of an accident and will transfer the forces from a side impact to the vehicle's frame rails rather than collapsing against the fuel tank's mid-portion.

This invention consists of a protective cage that includes front and rear sections and a shelf section all of which are welded together as a rigid weldment.

This invention further consists of a protective cage that includes front and rear sections, a shelf section and right and left longitudinally extending structural members that protect the mid-sides of the fuel tank from the lower flange edge and also adds strength and rigidity to the protective cage.

This invention consists of a protective cage for a vehicle fuel tank that can be secured to the frame rails of a vehicle that has its engine mounted at either the front or the rear of the frame rails.

This invention comprises a protective cage for a vehicle fuel tank that is stronger, more rigid and lighter than the protective cages that are now available in the prior art.

The present invention, together with further objects and advantages, will be best understood by reference to the following detailed description taken in conjunction with the accompanying drawings.

BRIEF DESCRIPTION OF THE DRAWINGS

FIG. 2 is a perspective view of an embodiment of the protective cage in which the vertically extending mounting sections are separate welded elements.

FIG. 3 is a perspective view of the embodiment of the protective cage seen in FIG. 2 having the fuel tank secured thereto.

FIG. 4 is an end view of the embodiment of the protective cage seen in FIGS. 1 and 2 that has been mounted on the vehicle frame rails.

FIG. 5 is a perspective view of an embodiment of the protective cage in which the vertically extending mounting sections are integral with bottom shelf elements.

FIG. 6 is a perspective view of the embodiment of the protective cage seen in FIG. 5 having the fuel tank secured thereto.

FIG. 7 is an end view of the embodiment of the protective cage seen in FIGS. 4 and 5 that has been mounted on the vehicle frame rails.

DETAILED DESCRIPTION OF THE PREFERRED EMBODIMENT

Figure 1:
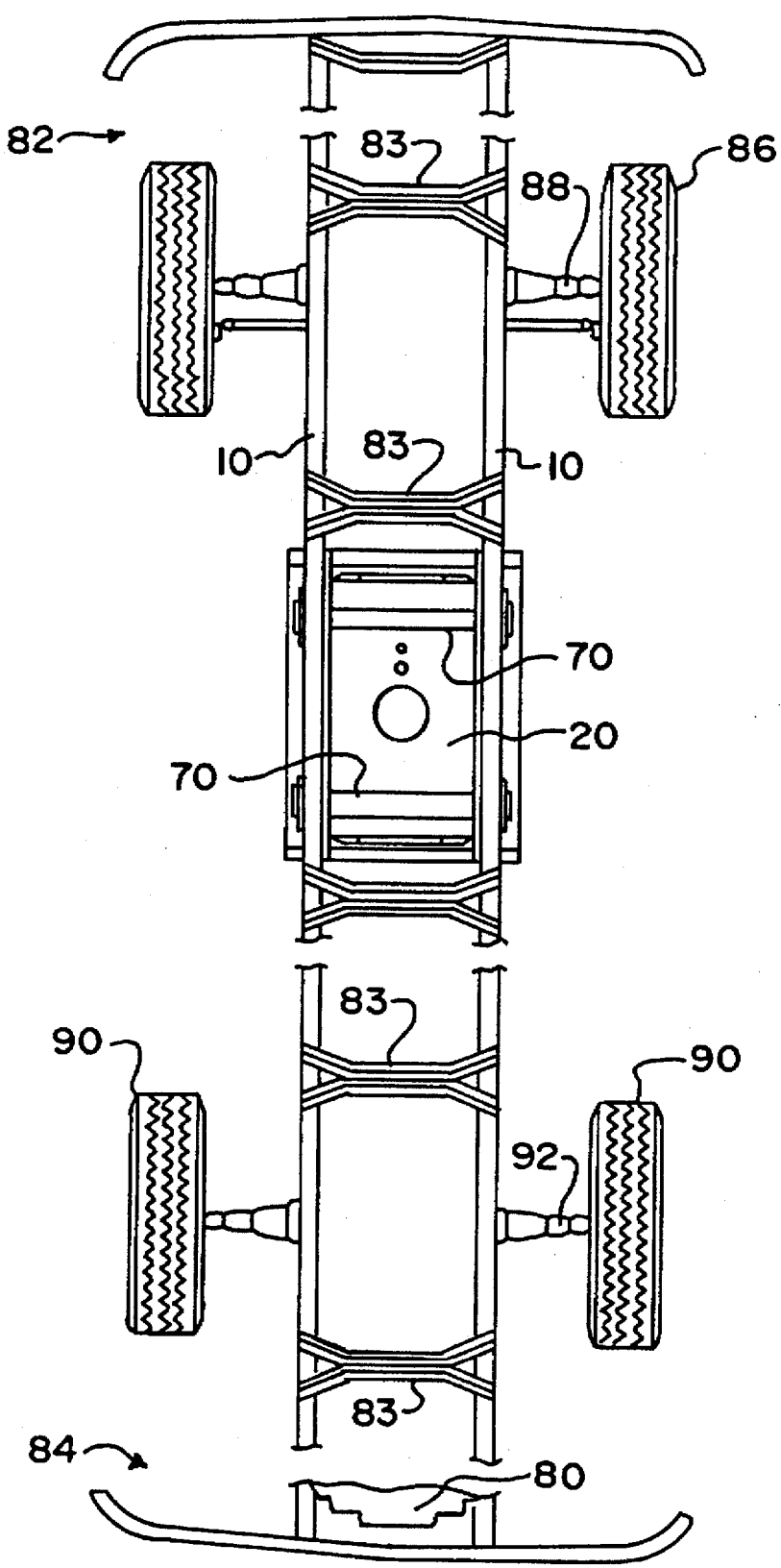
FIG. 1 is a plan view of a vehicle chassis, of the type having a rear mounted engine and a mid-mounted fuel tank and protective cage.

FIG. 1 is a plan view of a vehicle chassis of the type having its engine 80 mounted at its rear. The longitudinally extending frame rails 10 extend from the front 82 to the rear 84 of the vehicle and are connected by cross members 83 called dog-bones. The front steerable wheels 86 are carried by the front axle 88 and the rear drive wheels 90 are carried by the rear drive axle 92. The engine 80 is connected to the drive axle 92 and wheels 90 through a drive mechanism. The fuel tank mounting and protective cage 18, to which the fuel tank 20 is connected by hold down devices 70, is secured through its mounting plates 32 to the outwardly facing vertical surfaces 15 of the longitudinally extending frame rails 10. The fuel tank mounting and protective cage 18 is mounted to the longitudinally extending frame rails 10 at a mid location of the vehicle between the front and rear axles 88 and 92 respectively.

Referring to FIG. 2, which is a perspective view of an embodiment of the fuel tank mounting and protective cage 18. The fuel tank mounting and protective cage 18 is a weldment that is constructed from low carbon, high strength steel tubing having rectangular cross-sections. The shelf section 30 is an assembly comprising first and second longitudinal frame members 31 and first and second transverse frame members 33. The first and second transverse frame members 33 include upwardly facing tank supporting surfaces 39. The frame members 31 and 33 are formed from low carbon, high strength steel tubing having rectangular cross-sections. The bottom surfaces of longitudinal frame members 31 are welded to the upwardly facing tank supporting surfaces 39 of the transverse frame members 33. The shelf section 30 also includes a pair of left vertically extending mounting sections 35 and a pair of right vertically extending mounting sections 37. As used throughout this specification the terms "right" and "left" are used looking from the front of the vehicle to the rear. The mounting sections 35 and 37 are formed from low carbon, high strength steel tubing having rectangular cross-sections and are welded to the longitudinal frame members 31 at their lower ends. Each of the mounting sections 35 and 37 has a mounting side 36 and the mounting sides 36 of the mounting sections 35 face the mounting sides 36 of mounting sections 37. A mounting plate 32 is welded to the mounting side 36 of each mounting section 35, 37. Apertures 34 are formed in mounting plates 32, through which securing mechanisms 40 such as nuts and bolts extend to secure the mounting plates 32 to the outwardly facing vertical surfaces 15 of the longitudinally extending frame rails 10. The frame rails 10 extend the entire length of the vehicle chassis and function as the frame to which all other major components such as the engine and the wheels are mounted. It is important that the mounting plates 32 be securely connected to the mounting and protective cage 18 because they are the sole connecting support for the mounting and protecting cage to the vehicle. The mounting plates 32 have six apertures 34 formed therethrough. There are apertures formed in the vertical surfaces 15 of the frame rails 10 that correspond to the apertures 34 formed in the mounting plate 32. Securing mechanisms 40 such as bolts are inserted through these aligned holes and torqued down to provide a rigid connection between the mounting and protective cage 18 and the vehicle frame rails 10. The first and second longitudinal frame members 31, first and second transverse frame members 33, left and right vertically extending mounting sections 35, 37 and mounting plates 32 are all welded together to form a rigid and strong weldment.

A front section 24 and rear section 27 are welded to front and rear ends respectively of the first and second longitudinally extending frame members 31. Front and rear sections or abutment members 24 and 27 are fixed at a level above the upwardly facing tank supporting surfaces and are formed from low carbon, high strength steel tubing having rectangular cross-sections.

A right longitudinally extending member 50, having a rear extremity 52 and a forward extremity 54, and a left longitudinally extending member 60, having a rear extremity 62 and a forward extremity 64 are located such that their bottom surfaces are in engagement with the upper edges of front and rear sections 24, 27. The outwardly facing edge 56 of the right longitudinally extending member 50 is secured by welding to the mounting sides 38 of the right vertically extending mounting sections 37. Also, the outwardly facing edge 66 of the left longitudinally extending member 60 is secured by welding to the mounting sides 36 of the left vertically extending mounting sections 35. The left and right longitudinally extending members 50 and 60 are fixed above the upwardly facing tank supporting surfaces 39. As is best seen in FIG. 4 the inner edges 58 and 68 of right and left longitudinally extending members 50 and 60 function as enclosure edges that extend inwardly further than the inner edges of lower flanges 14. As a result of this arrangement, in the advent of an accident in which a side of the fuel tank mounting and protective cage is struck and bent inwardly, the broad inward facing edges 58 or 68 of the longitudinal extending members 50 or 60 will engage the mid sides of fuel tank 20 rather than the rather sharp edges of the flanges 14. This reduces the likelihood of rupturing the fuel tank 20. The welded construction of the shelf section 30, and its securement by welding to right and left longitudinally extending members 50 and 60, front section 24 and rear section 27 forms an enclosure that is dimensioned and shaped to receive and support the fuel tank 20. This weldment provides stiff joints with the result that there will be less rotation and localized deformation of the fuel tank mounting and protective cage in the event of an accident.

Hold down devices 70, are formed of straps made from steel or plastic, that wrap around the fuel tank 20 and have T-bolts 72 connected at both ends. The T-bolts 72 extend through apertures 74 formed in first and second transverse frame members 33. The mounting and protective cage 18 is secured by nuts and bolts to the vertical surface 15 of the frame rails 10. The fuel tank 20 is secured to the mounting and protective cage 18 and is thus not directly connected to the frame rails 10. This construction minimizes the relative motion between the fuel tank 20 and the mounting and protective cage 18 which results in less deformation of fuel tank 20 in the event of an accident.

A second embodiment of the protective cage is illustrated in FIGS. 4–6. The shelf section 130 of the second embodiment differs from the shelf section 30 of the embodiment illustrated in FIGS. 1–3. The same reference number has been used to identify components of the second embodiment that are the same as the corresponding components of the first embodiment.

The shelf section 130 includes first and second longitudinal frame members 131 and first and second transverse frame members 133 that are welded to each other along their linear intersections. The first and second transverse frame members 133 each include an integrally formed left vertically extending mounting sections 135 and a right vertically extending mounting sections 137. The left vertically extending mounting sections 135 have mounting sides 136 and the right vertically extending mounting sections 137 have mounting sides 138. Mounting plates 132 having apertures 134 formed therein are welded to the mounting sides 136 and 138 of the left 135 and right 137 vertically extending mounting sections.

The outwardly facing edge 56 of the right longitudinally extending member 50 is secured by welding to the mounting sides 138 of the right vertically extending mounting sections 137. Also, the outwardly facing edge 66 of the left longitudinally extending member 60 is secured by weld to the mounting sides 136 of the left vertically extending mounting sections 135. The welded construction of the shelf section 130, and its weld to right and left longitudinally extending members 50 and 60, front section 24 and rear section 27 provides for stiff joints with the result that there will be less rotation and localized deformation in the event of an accident.

As is best seen in FIG. 7 the inner edges 58 and 68 of right and left longitudinally extending members 50 and 60 extend inwardly further than the inner edges of lower flanges 14. As a result of this arrangement, in the advent of an accident, in which a side of the fuel tank mounting and protective cage is struck and bent inwardly, the broad inward facing edges 58 and 68 of longitudinally extending members 50 and 60 will engage the mid sides of fuel tank 20 rather than the rather sharp edges of the flanges 14. As a result the likelihood of rupturing the fuel tank 20 is greatly reduced.

Apertures 34 are formed in mounting plates 32, through which securing mechanisms 40 such as nuts and bolts extend to secure the mounting plates 32 to the outwardly facing vertical surfaces 15 of the longitudinally extending frame rails 10.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. In combination with a vehicle of the type having longitudinally extending frame rails having transversely outwardly facing vertical surfaces and transversely inwardly facing flanges, a fuel tank disposed between said frame rails, and a fuel tank mounting and protective cage secured to the outwardly facing vertical surfaces of the frame rails, the improvement wherein said improved fuel tank mounting and protective cage comprises:

a transversely extending front section having a right extremity and a left extremity;

a transversely extending rear section having a right extremity and a left extremity;

a shelf section interconnecting said front section and said rear section and including an upwardly facing tank supporting surface, a plurality of right vertically extending mounting sections, and a plurality of left vertically extending mounting sections, said right and left vertically extending mounting sections each having a transversely inwardly facing mounting side mounted to said outward surfaces of said frame rails, said front and rear sections, shelf section and vertically extending mounting sections being welded to each other to produce an integrated unitary structure;

a fuel tank secured to said tank supporting surface; and a right longitudinally extending member and a left longitudinally extending member, said longitudinally extending members being welded respectively between the extremities of said front and rear sections and to the mounting sides of said vertically extending mounting sections, said longitudinally extending members being disposed respectively between said fuel tank and said mounting sides of said vertically extending mounting sections above said tank supporting surface and adjacently below said frame rail flanges and extending parallel thereto.

2. The invention as set forth in claim 1 wherein mounting plates are secured to the mounting side of said vertically extending mounting sections and securing devices for removably securing said mounting plates to said outwardly facing vertical surfaces of the longitudinally extending rails.

3. A fuel tank mounting and protective cage of the type that is adapted to be secured to the outwardly facing vertical surfaces of a vehicle's frame rails, comprising:

a transversely extending front section having a right extremity and a left extremity;

a transversely extending rear section having a right extremity and a left extremity;

a shelf section interconnecting said front section and said rear section and including an upwardly facing tank supporting surface, a plurality of right vertically extending mounting sections, and a plurality of left vertically extending mounting sections, said right and left vertically extending mounting sections each having a transversely inwardly facing mounting side having mounting plates adapted for mounting to said outward surfaces of said frame rails, said front and rear sections, shelf section and vertically extending mounting sections being welded to each other to produce an integrated unitary structure; and a right longitudinally extending member and a left longitudinally extending member, said longitudinally extending members being welded respectively between the extremities of said front and rear sections and to the mounting sides of said vertically extending mounting sections, said longitudinally extending members being disposed respectively inwardly adjacent said mounting sides of said vertically extending mounting sections above said tank supporting surface and extending parallel thereto and below said mounting plates.

4. The invention as set forth in claim 3 wherein said longitudinally extending members each have a transverse width which is larger than a transverse width of said frame rails.

5. The invention as set forth in claim 3, wherein hold down devices are carried by the shelf-section of the protective cage for securing a fuel tank thereto.

6. In combination with a vehicle of the type having longitudinally extending frame rails having inwardly facing flanges that are a fixed distance apart and a web section therebetween which extends vertically such that they provide outwardly facing vertical surfaces, a fuel tank mounting and protective cage secured to the outwardly facing vertical surfaces of the frame rail, comprising:

an integrated welded cage structure formed from low carbon, high strength steel tubing having rectangular cross-sections, said cage structure including an upwardly facing tank supporting surface, said cage structure including front and rear transversely extending tank abutment members having upper surfaces disposed at a level above said upwardly facing tank supporting surface and a plurality of mounting members having mounting surfaces affixed to said frame rails that are normal to said upwardly facing tank supporting surface and to said front and rear tank abutment members;

said cage structure further including right and left horizontal longitudinally extending members that are disposed above said upwardly facing tank supporting surface and adjacently below said frame rail flanges;

said front and rear tank abutment members and said right and left longitudinally extending members in cooperation with said upwardly facing tank supporting surface forming an enclosure that is dimensioned and shaped to receive and support a fuel tank; and said right and left longitudinally extending members defining longitudinally extending enclosure edges that are spaced from each other a distance that is less than said fixed distance.

7. The invention as set forth in claim 6 wherein fuel tank hold down devices are carried by said cage structure for securing the fuel tank to said upwardly facing tank supporting surface such that the longitudinally extending edges of said fuel tank are adjacent but spaced from said right and left longitudinally extending members.

8. In a vehicle of the type having longitudinally extending frame rails having inwardly facing flanges that are a fixed distance apart and a web section therebetween which extends vertically such that they provide outwardly facing vertical surfaces, said frame rails having front and rear ends, steerable wheels mounted adjacent the front ends of said frame rails, drive wheels mounted adjacent the rear ends of said frame rails and the vehicle engine mounted on the rear ends of said frame rails and connected through a drive mechanism to the drive wheels, wherein the improvement comprises:

a fuel tank mounting and protective cage secured to the outwardly facing vertical surfaces of the frame rail at a mid-location between said steerable and drive wheels;

a fuel tank disposed within said cage and between said frame rails, said cage including:

an integrated welded cage structure formed from low carbon, high strength steel tubing having rectangular cross-sections, said cage structure including an upwardly facing tank supporting surface, said cage structure including front and rear transversely extending portions and vertical mounting members having mounting surfaces affixed to said frame rails that are normal to said upwardly facing tank supporting surface;

said cage structure further including right and left horizontal longitudinally extending members that are disposed above said upwardly facing tank supporting surface and adjacently below said frame rail flanges and between said fuel tank and said mounting members;

said right and left longitudinally extending members defining longitudinally extending enclosure edges that are spaced from each other a distance that is less than said fixed distance.

9. The invention as set forth in claim 8 and said front and rear sections comprising tank abutment members having upper surfaces disposed at a level above said upwardly facing tank supporting surface and said right and left longitudinally extending members defining longitudinally extending enclosure edges to thereby form an enclosure that is dimensioned and shaped to receive and support a fuel tank.

10. The invention as set forth in claim 8 wherein said vertical mounting members comprise a continuation of said front and rear portions.

* * * * *